(12) United States Patent
Boyd

(10) Patent No.: US 9,229,141 B2
(45) Date of Patent: Jan. 5, 2016

(54) OPTICAL ASSEMBLY

(71) Applicant: 3M INNOVATIVE PROPERTIES COMPANY, St. Paul, MN (US)

(72) Inventor: Gary T. Boyd, Woodbury, MN (US)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 0 days.

(21) Appl. No.: 14/105,967

(22) Filed: Dec. 13, 2013

(65) Prior Publication Data

US 2014/0168766 A1 Jun. 19, 2014

Related U.S. Application Data

(60) Provisional application No. 61/736,901, filed on Dec. 13, 2012.

(51) Int. Cl.
*G02B 5/30* (2006.01)
*G02B 5/02* (2006.01)

(52) U.S. Cl.
CPC ............... *G02B 5/30* (2013.01); *G02B 5/0231* (2013.01); *G02B 5/0236* (2013.01); *G02B 5/3033* (2013.01)

(58) Field of Classification Search
CPC .. G02B 5/3025; G02B 5/3058; G02B 5/3041; G02B 5/3066; G02F 1/133536
USPC ..................................... 359/485.01
See application file for complete search history.

(56) References Cited

U.S. PATENT DOCUMENTS

| 6,239,851 | B1* | 5/2001 | Hatazawa et al. ........... 349/62 |
| 6,719,426 | B2 | 4/2004 | Magarill et al. |
| 2006/0039069 | A1* | 2/2006 | Hayashi et al. ........... 359/486 |
| 2008/0064133 | A1 | 3/2008 | Lee et al. |
| 2009/0052195 | A1* | 2/2009 | Saneto et al. ........... 362/355 |
| 2010/0026727 | A1* | 2/2010 | Bita et al. ........... 345/690 |
| 2010/0245722 | A1* | 9/2010 | Yoneyama et al. ........... 349/84 |
| 2012/0224150 | A1* | 9/2012 | Liu et al. ........... 353/29 |

FOREIGN PATENT DOCUMENTS

| WO | WO 2008/144136 A2 | 11/2008 |
| WO | WO 2008/144644 A2 | 11/2008 |
| WO | WO 2010/059566 A1 | 5/2010 |
| WO | WO 2010/059568 A1 | 5/2010 |
| WO | WO2010/059579 A1 | 5/2010 |
| WO | WO 2010/059614 A1 | 5/2010 |
| WO | WO 2010/141261 A2 | 12/2010 |
| WO | WO 2012/138495 A1 | 10/2012 |

* cited by examiner

*Primary Examiner* — Scott J Sugarman
*Assistant Examiner* — Alberto Betancourt
(74) *Attorney, Agent, or Firm* — Daniel J. Iden

(57) ABSTRACT

An optical assembly includes a light directing film having an average effective transmission of at least 1.3, a light diffusing film having an optical haze of at least 5% and a plurality of spaced apart posts disposed and defining an air gap between the light directing and diffusing films. The posts are attached to a first major surface of the substrate and an opposing second end of each post is attached to the light diffusing film via a first adhesive layer. The first adhesive layer forms a meniscus at each post having an outer surface radius of at least 0.5 micrometers.

21 Claims, 3 Drawing Sheets

US 9,229,141 B2

OPTICAL ASSEMBLY

FIELD

The disclosure relates to optical assembly and, in particular, to optical films that can be bonded together with no of very little loss in optical properties.

BACKGROUND

Display systems, such as liquid crystal display (LCD) systems, are used in a variety of applications and commercially available devices such as, for example, computer monitors, personal digital assistants (PDAs), mobile phones, miniature music players, and thin LCD televisions. Most LCDs include a liquid crystal panel and an extended area light source, often referred to as a backlight, for illuminating the liquid crystal panel. Backlights typically include one or more lamps and a number of optical or light management films such as, for example, lightguides, mirror films, light redirecting films, retarder films, light polarizing films, and diffuser films. Diffuser films can be included to hide optical defects and improve the brightness uniformity of the light emitted by the backlight.

BRIEF SUMMARY

The present disclosure relates to optical assembly and, in particular, to optical films that are bonded together with no of very little loss in optical properties. Posts separate adjacent optical films and define an air gap. The posts are fixed to a first optical film and attached to a second optical film via an adhesive forming a meniscus at each post.

In many embodiments the optical assembly includes a light directing film having an average effective transmission of at least 1.3, a light diffusing film having an optical haze of at least 5%, and a plurality of spaced apart posts disposed and defining an air gap between the light directing and diffusing films. The plurality of spaced part posts are disposed on a first major surface of a substrate having an opposing second major surface. A first end of each post is attached to the first major surface of the substrate; an opposing second end of each post is attached to the light diffusing film via a first adhesive layer. The first adhesive layer forms a meniscus at each post. The meniscus has an outer surface radius of at least 0.5 micrometers.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The disclosure may be more completely understood in consideration of the following detailed description of various embodiments of the disclosure in connection with the accompanying drawings, in which.

Figure 1:
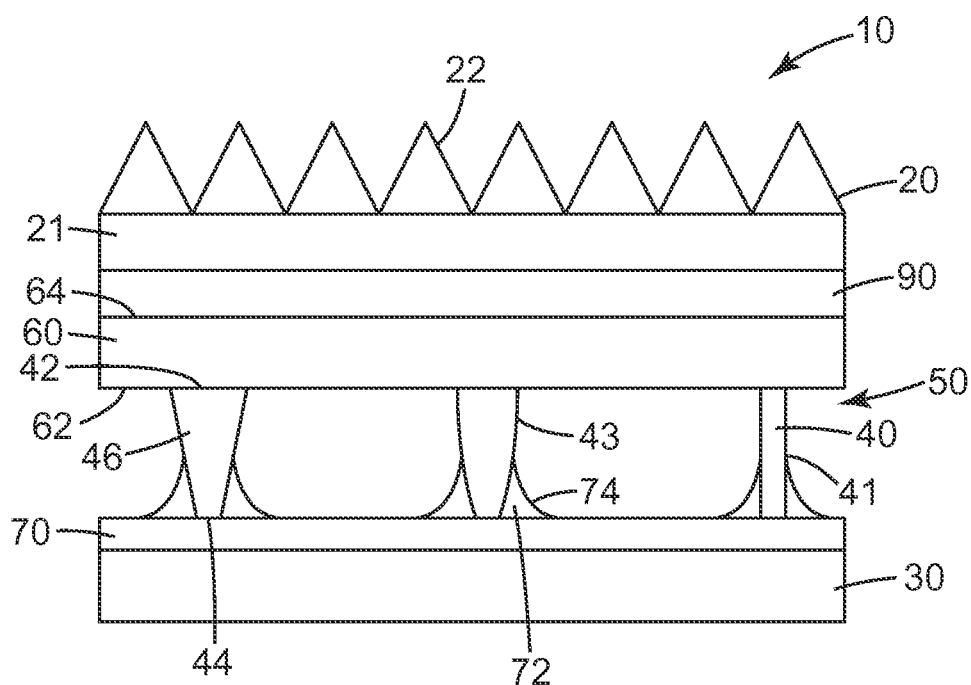
FIG. 1 is a schematic side view of an optical assembly.

The schematic drawings presented herein are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Any direction referred to herein, such as "top," "bottom," "left," "right," "upper," "lower," "above," "below," and other directions and orientations are described herein for clarity in reference to the figures and are not to be limiting of an actual device or system or use of the device or system. Many of the devices, articles or systems described herein may be used in a number of directions and orientations.

The present disclosure relates to optical assembly and, in particular, to optical films that are bonded together with no of very little loss in optical properties. Posts separate adjacent optical films and define an air gap. The posts are fixed to a first optical film and attached to a second optical film via an adhesive forming a meniscus at each post. The meniscus is preferably formed joining the post to a light diffusing film. It has been found that the meniscus of adhesive provides a secure bond between the second optical film (e.g., light diffusing film) and the post while minimizing loss of optical properties of the first and second optical film forming the optical assembly. While the present disclosure is not so limited, an appreciation of various aspects of the disclosure will be gained through a discussion of the examples provided below.

Figure 2:
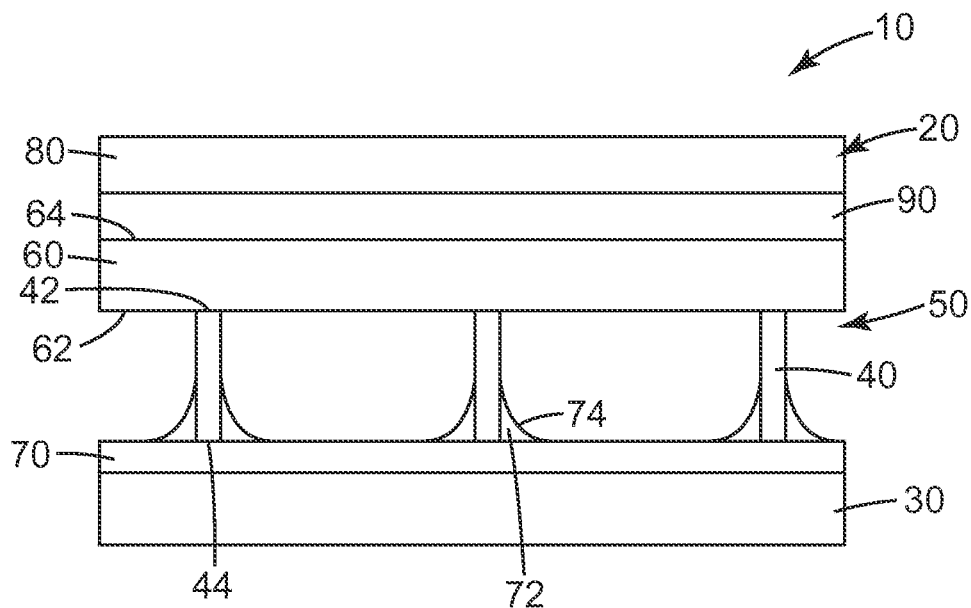
FIG. 2 is a schematic side view of another optical assembly.
Figure 3:
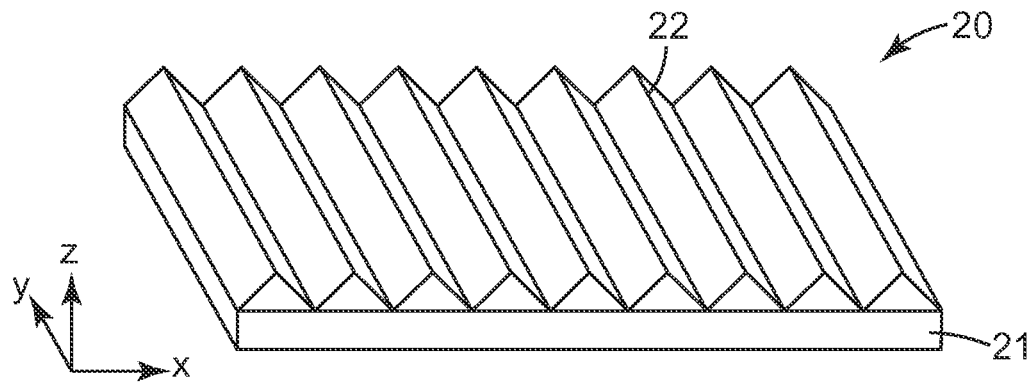
FIG. 3 is a schematic perspective view of a light directing film.

FIG. 1 is a schematic side view of an optical assembly 10. FIG. 2 is a schematic side view of another optical assembly 10. FIG. 3 is a schematic perspective view of a light directing film 20.

An optical assembly 10 includes a light directing film 20 having an average effective transmission of at least 1.3, or at least 1.5, or at least 1.7, or at least 1.9, or at least 2.1, a light diffusing film 30 having an optical haze of at least 5%, or at least 10%, or at least 20%, or at least 30%, or at least 40%, or at least 50%, or at least 60%, or at least 70%, or at least 80%, or at least 90%, and a plurality of spaced apart posts 40 disposed and defining an air gap 50 between the light directing film 20 and the light diffusing film 30. The plurality of spaced apart posts 40 join the light directing film 20 to the light diffusing film 30 with a minimum amount of interface area to maintain the optical properties of the respective films.

The plurality of spaced part posts 40 are disposed on a first major surface 62 of a substrate 60 having an opposing second major surface 64. A first end 42 of each post is attached to the first major surface 62 of the substrate 60. In many embodiments the post 40 is integrally formed with the substrate 60. An opposing second end 44 of each post is attached to the light diffusing film 30 via a first adhesive layer 70. The first adhesive layer 70 forms a meniscus 72 at each post. The meniscus 72 has an outer surface 74 radius of at least 0.5 micrometers or at least 1 micrometer, or at least 1.5 micrometer, or at least 2 micrometers. Applicants have discovered that placing the meniscus 72 at the diffuser film 30 side of the post 40 minimizes optical property loss as compared to placing the meniscus 72 at the light directing film 20 side of the post 40. The posts 40 can have any useful dimensions and be formed of any useful material (i.e., polymer). In many embodiments the posts 40 extend orthogonally between the first major surface 62 of the substrate 60 and the first adhesive layer 70. The plurality of spaced apart posts 40 can include a two-dimensional array of posts that is formed of discrete and spaced apart posts. In many of these embodiments, each post 40 in the two-dimensional array of posts has a ratio of a height of the post to a width of the post is less than 100 or less than 50 or less than 20. The plurality of spaced apart posts 40 can include a one dimensional array of spaced apart parallel linear posts. In many of these embodiments each linear post has a ratio of a length of the post to a width of the post is at least 10 or at least 50 or at least 100 or at least 500 or at least 1000. In some embodiments the posts have a height in a range from 1 to 10 micrometers or from 4 to 6 micrometers and a width in a range from 0.5 to 5 micrometers or from 1 to 2 micrometers and a distance between. The air gap 50 can have an average height $H_{avg}$, each post can have a maximum lateral width $W_{max}$, a minimum lateral width $W_{min}$ and an average lateral width $W_{avg}$ in the air gap 50. In many embodiments, $W_{max}/W_{min}$ is less than 5 or less than 3 or less than 2, and $H_{avg}/W_{avg}$ is at least 2 or at least 3 or at least 4 or at least 5.

The posts 40 can have any useful cross-section. In many embodiments the posts 40 have a cross-section of each linear post in a direction perpendicular to the length of the post includes a straight side edge 41, or a curved side edge 43, or a trapezoid 46, as illustrated in FIG. 1. In many embodiments, at least some of the posts 40 in the plurality of spaced apart posts include a piecewise planar facet or a piecewise curved facet.

The first adhesive layer 70 can be formed from any useful optical adhesive and have any useful thickness. In many embodiments, the average thickness of the first adhesive layer 70 is less than 10 or less than 8 or less than 6 or less than 4 micrometers. The meniscus 72 at each post 40 is formed from adhesive from the first adhesive layer 70 flowing around the post 40. The amount of adhesive forming the meniscus 72 provides adhesive strength fixing the post 40 to the first adhesive layer 70. As described above, with the meniscus 72 at the diffuser film 30 side, the optical properties (e.g., luminance) is independent of the meniscus 72 size (e.g., radius).

In many embodiments, the optical adhesive forming the first adhesive layer 70 is any polyacrylate adhesive that is curable or cross-linkable or that can be combined with a cross-linking material to create a structural adhesive. In one embodiment, the adhesive includes about 35 wt-% to about 75 wt-% polyacrylate. In another embodiment, the polyacrylate is a pressure sensitive adhesive. In another embodiment, the polyacrylate includes monomeric repeat units being branched $C_4$-$C_{12}$ alkyl groups, such as isooctyl. In one embodiment, the polyacrylate includes repeat units derived from acrylic acid. In one embodiment, the polymerizable monomer is an epoxy component and the adhesive composition further includes a photoactivated cationic initiator. In another embodiment, the polymerizable monomer includes at least three (meth)acrylate groups and the adhesive composition further includes a free-radical photoinitiator. In yet another embodiment, the adhesive includes a (e.g. light transmissive) filler such that the adhesive has a haze ranging from about 2% to 30%.

The light directing film includes prism film 20 and reflective polarizer 80. In some embodiments the light directing film includes both a prism film 20 and a reflective polarizer 80. In some embodiments the second major surface 64 of the substrate 60 is attached to the light directing film 20, 80 via a second adhesive layer 90. The second adhesive layer 90 can be any useful optical adhesive as described for the first adhesive layer 70.

In many embodiments, the light directing film 20 includes a plurality of linear prisms 22 extending along a same direction (see FIG. 1 and FIG. 3). In many embodiments the linear prisms 22 are formed on a substrate 21. Light directing film 20 includes a plurality of microstructures or linear prisms 22 that extend along the y-direction.

Light directing film 20 including a plurality of linear prisms 22 can have any index of refraction that may be desirable in an application. For example, in some cases, the index of refraction of the prism layer is in a range from about 1.4 to about 1.8, or from about 1.5 to about 1.8, or from about 1.5 to about 1.7. In some cases, the index of refraction of the prism layer is not less than about 1.5, or not less than about 1.55, or not less than about 1.6, or not less than about 1.65, or not less than about 1.7.

In some cases, such as when light directing film 20 is used in a liquid crystal display system, the light directing film 20 and resulting optical assembly 10 can increase or improve the brightness of the display. In such cases, the light redirecting film has an effective transmission or relative gain that is greater than 1. As used herein, effective transmission is the ratio of the luminance of the display system with the film in place in the display system to the luminance of the display without the film in place.

Effective transmission (ET) can be measured using optical system centered on an optical axis and includes a hollow lambertian light box that emits a lambertian light through an emitting or exit surface, a linear light absorbing polarizer, and a photo detector. Light box is illuminated by a stabilized broadband light source that is connected to an interior of the light box via an optical fiber. A test sample, the ET of which is to be measured by the optical system, is placed at a location between the light box and the absorbing linear polarizer.

The ET of the light directing film 20 can be measured by placing the light directing film 20 at the location between the light box and the absorbing linear polarizer with linear prisms 22 facing the photo detector and prism microstructures facing the light box. Next, the spectrally weighted axial luminance $I_1$ (luminance along optical axis) is measured through the linear absorbing polarizer by the photo detector. Then, the light directing film 20 is removed and the spectrally weighted luminance $I_2$ is measured without the light directing film 20. ET is the ratio $I_1/I_2$. ET0 is the effective transmission when linear prisms 22 extend along a direction that is parallel to the polarizing axis of linear absorbing polarizer, and ET90 is the effective transmission when linear prisms 22 extend along a direction that is perpendicular to the polarizing axis of the linear absorbing polarizer. The average effective transmission (ETA) is the average of ET0 and ET90.

Effective transmission values disclosed herein were measured using a SpectraScan™ PR-650 SpectraColorimeter (available from Photo Research, Inc, Chatsworth, Calif.) for photo detector. Light box is a Teflon cube with a total reflectance of about 85%.

In some cases, such as when light directing film 20 is used in a display system to increase the brightness and the linear prisms have an index of refraction that is at least about 1.6, the average effective transmission (ETA) of the light redirecting film is at least about 1.3, or at least 1.5, or at least 1.7, or at least 1.9, or at least 2.1.

Reflective polarizer 80 substantially reflects light that has a first polarization state and substantially transmits light that has a second polarization state, where the two polarization states are mutually orthogonal. For example, the average reflectance of reflective polarizer 80 in the visible for the polarization state that is substantially reflected by the reflective polarizer is at least about 50%, or at least about 60%, or at least about 70%, or at least about 80%, or at least about 90%, or at least about 95%. As another example, the average transmittance of reflective polarizer 80 in the visible for the polarization state that is substantially transmitted by the reflective polarizer is at least about 50%, or at least about 60%, or at least about 70%, or at least about 80%, or at least about 90%, or at least about 95%, or at least about 97%, or at least about 98%, or at least about 99%. In some cases, reflective polarizer 80 substantially reflects light having a first linear polarization state (for example, along the x-direction) and substantially transmits light having a second linear polarization state (for example, along the y-direction).

Any suitable type of reflective polarizer may be used for reflective polarizer layer 80 such as, for example, a multilayer optical film (MOF) reflective polarizer, a diffusely reflective polarizing film (DRPF) having a continuous phase and a disperse phase, such as a Vikuiti™ Diffuse Reflective Polarizer Film ("DRPF") available from 3M Company, St. Paul, Minn., a wire grid reflective polarizer described in, for example, U.S. Pat. No. 6,719,426, or a cholesteric reflective polarizer.

For example, in some cases, reflective polarizer 80 can be or include an MOF reflective polarizer, formed of alternating layers of different polymer materials, where one of the sets of alternating layers is formed of a birefringent material, where the refractive indices of the different materials are matched for light polarized in one linear polarization state and unmatched for light in the orthogonal linear polarization state. In such cases, an incident light in the matched polarization state is substantially transmitted through reflective polarizer 80 and an incident light in the unmatched polarization state is substantially reflected by reflective polarizer 80. In some cases, an MOF reflective polarizer 80 can include a stack of inorganic dielectric layers.

As another example, reflective polarizer 80 can be or include a partially reflecting layer that has an intermediate on-axis average reflectance in the pass state. For example, the partially reflecting layer can have an on-axis average reflectance of at least about 90% for visible light polarized in a first plane, such as the xy-plane, and an on-axis average reflectance in a range from about 25% to about 90% for visible light polarized in a second plane, such as the xz-plane, perpendicular to the first plane. Such partially reflecting layers are described in, for example, U.S. Patent Publication No. 2008/0064133, the disclosure of which is incorporated herein in its entirety by reference.

In some cases, reflective polarizer 80 can be or include a circular reflective polarizer, where light circularly polarized in one sense, which may be the clockwise or counterclockwise sense (also referred to as right or left circular polarization), is preferentially transmitted and light polarized in the opposite sense is preferentially reflected. One type of circular polarizer includes a cholesteric liquid crystal polarizer.

In some cases, reflective polarizer 80 can be a multilayer optical film that reflects or transmits light by optical interference, such as those described in Provisional U.S. Patent Application No. 61/116,132, filed Nov. 19, 2008; Provisional U.S. Patent Application No. 61/116,291, filed Nov. 19, 2008; Provisional U.S. Patent Application No. 61/116,294, filed Nov. 19, 2008; Provisional U.S. Patent Application No. 61/116,295, filed Nov. 19, 2008; Provisional U.S. Patent Application No. 61/116,295, filed Nov. 19, 2008; and International Patent Application No. PCT/US2008/060311, filed May 19, 2008, claiming priority from Provisional U.S. Patent Application No. 60/939,085, filed May 20, 2007; all incorporated herein by reference in their entirety.

Light diffusing film 30 has a high optical haze and/or a high diffuse optical reflectance and/or transmittance. For example, in some cases, the optical haze of the light diffusing film 30 is not less than about 40%, or not less than about 50%, or not less than about 60%, or not less than about 70%, or not less than about 80%, or not less than about 85%, or not less than about 90%, or not less than about 95%.

Light diffusing film 30 can be or include any optical diffuser that may be desirable and/or available in an application. For example, light diffusing film 30 can be or include a surface diffuser, a volume diffuser, or a combination thereof. For example, light diffusing film 30 can include a plurality of particles having a first index of refraction $n_1$ dispersed in a binder or host medium having a different index of refraction $n_2$, where the difference between the two indices of refraction is at least about 0.01, or at least about 0.02, or at least about 0.03, or at least about 0.04, or at least about 0.05.

In many embodiments, the light diffusing film 30 is a symmetric diffuser that scatters light in a first direction with a first viewing angle $A_H$ and in a second direction orthogonal to the first direction with a second viewing angle $A_V$ substantially equal to $A_H$. In many of these embodiments, the difference between $A_V$ and $A_H$ is less than 10 degrees or less than 5 degrees. In some embodiments, the light diffusing film 30 is an asymmetric diffuser that scatters light in a first direction with a first viewing angle $A_H$ and in a second direction orthogonal to the first direction with a second viewing angle $A_V$ substantially different from $A_H$. In some of these embodiments, the difference between $A_V$ and $A_H$ is greater than 15 degrees, or greater than 20 degrees, or greater than 25 degrees.

Optical haze, as used herein, is defined as the ratio of the transmitted light that deviates from the normal direction by more than 4 degrees to the total transmitted light. Haze values disclosed herein were measured using a Haze-Gard Plus haze meter (available from BYK-Gardiner, Silver Springs, Md.) according to the procedure described in ASTM D1003.

Some of the advantages of the disclosed systems and constructions are further illustrated by the following example. The particular materials, amounts and dimensions recited in this example, as well as other conditions and details, should not be construed to unduly limit the present disclosure.

EXAMPLES

Example 1

A film was produced by microreplication on TBEF2 T 62i (available from 3M Company, St. Paul Minn.) using a patterned roll prepared with the cutting tool system previously described in International Patent Application No. PCT/US2010/036018. On the flat backside of this film (the side opposite the prism structures) microstructures consisting of an array of continuous parallel linear posts were cast and cured. The parallel linear posts were spaced 48 micrometers apart with rectangular vertical cross sections, about 1.5 micrometers in width and about 4 micrometers high.

The side of the film with the array of posts was then adhered to a surface diffuser film using the optically clear adhesive described in pending US patent application 61/471,661. An adhesive meniscus formed along the base of the posts adjacent to the diffusing film.

Example 2

Figure 4:
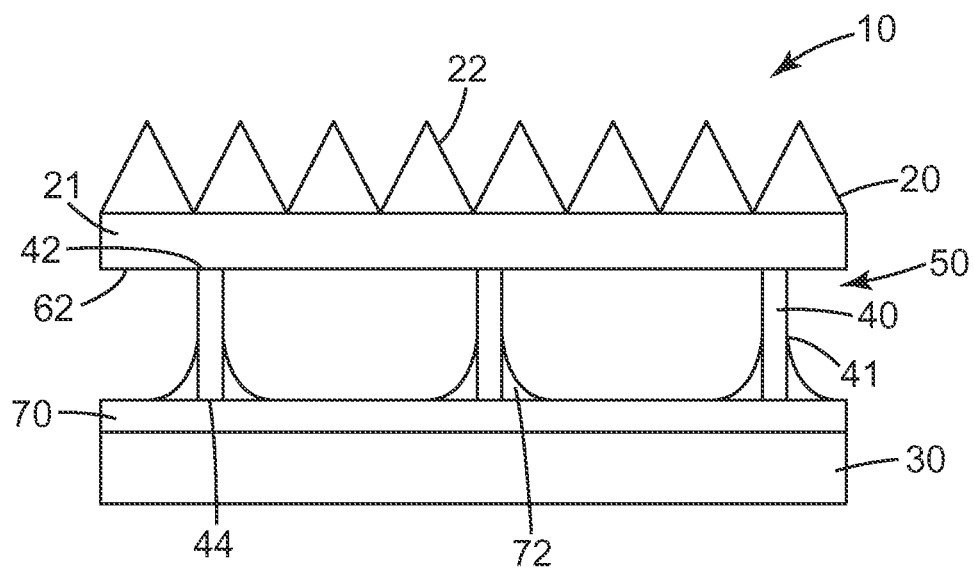
FIG. 4 is a schematic side view of the optical assembly of Examples 2 and 3.
Figure 5:
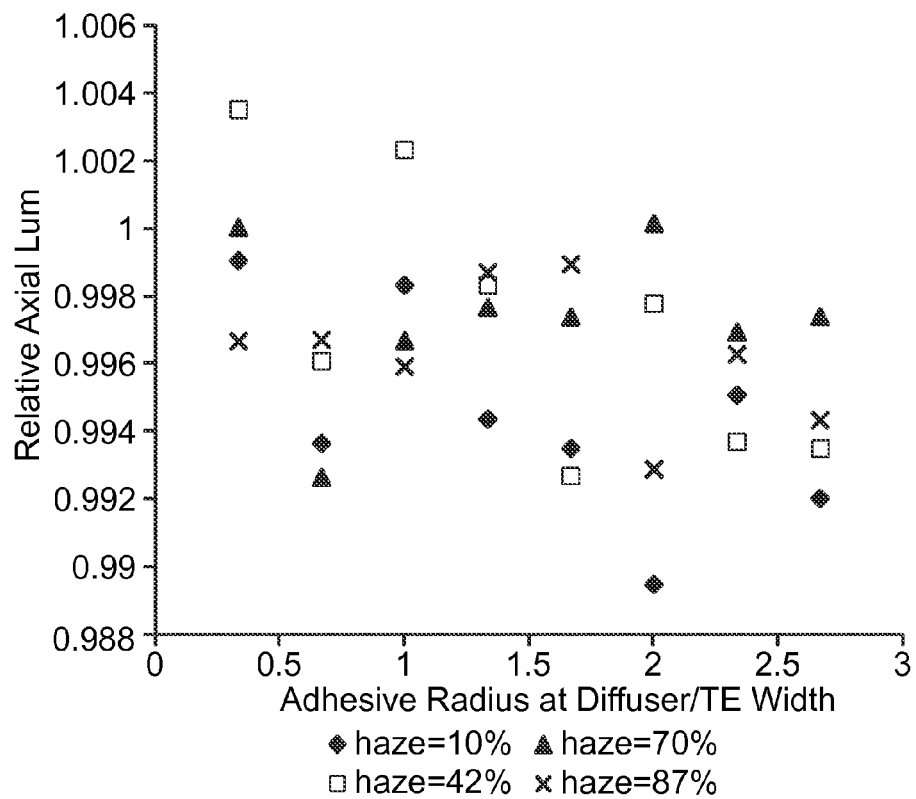
FIG. 5 is a plot of relative axial luminance for Example 2.

The configuration shown in FIG. 4 was modeled. LightTools (available from Synopsys, Inc., Pasadena Calif.) or any comparable software package could be used. Light directing film 20 was modeled as a brightness enhancing film with prisms having 90° vertex angles and pitch of 24 micrometers. Substrate 21 was 1 mil (25 micrometers) in thickness. Posts 40 were 4 micrometers in height, 1.5 micrometers in width, had rectangular vertical cross sections and were spaced 48 micrometers apart. Adhesive layer 70 had an index of 1.5 and matched the index of substrate 21. Diffuser film 30 was modeled as a surface diffuser with haze values of 10%, 42%, 70% or 87%. The model assumed that a Lambertian light source illuminated the construction from below the diffuser. Axial luminance was then computed for a variety of ratios of meniscus radius to post width. A relative axial luminance was computed as the ratio of the axial luminance with meniscus 74 present to axial luminance with posts but no meniscus. FIG. 5 shows a plot of relative axial luminance versus the meniscus radius to post width ratio.

Example 3

Figure 6:
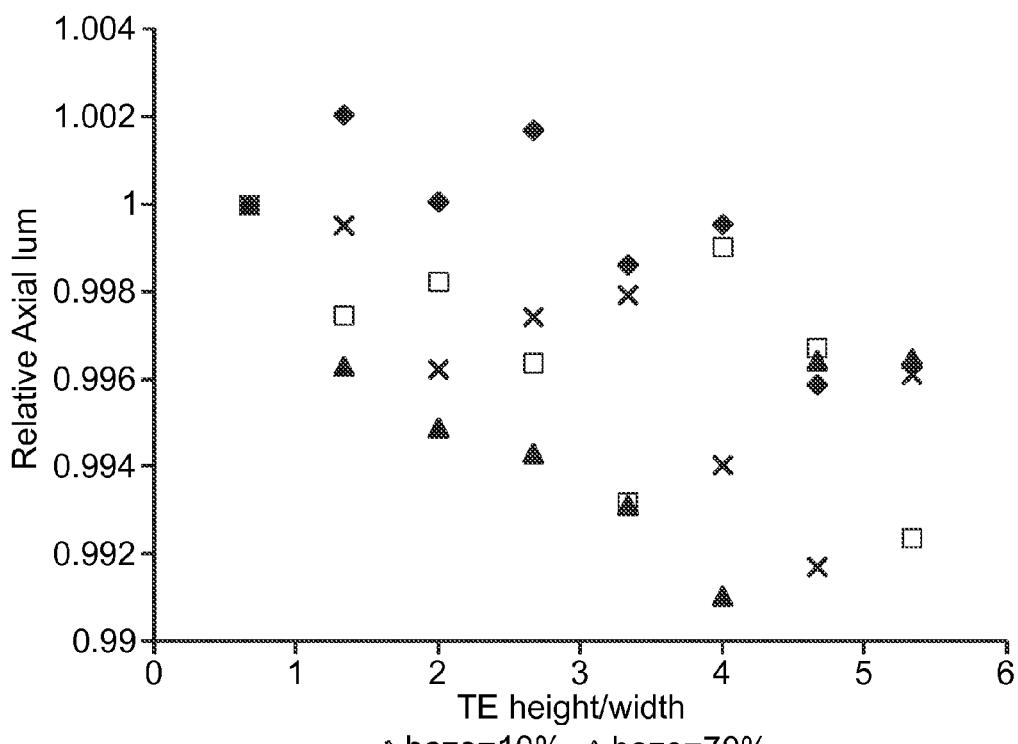
FIG. 6 is a plot of relative axial luminance for Example 3.

The same configuration was modeled, except that the height of the post was varied and the width was fixed at 1.5 micrometers. FIG. 6 shows a plot of relative axial luminance versus the ratio of post height to post width.

Thus, embodiments of OPTICAL ASSEMBLY are disclosed. One skilled in the art will appreciate that the optical films and film articles described herein can be practiced with embodiments other than those disclosed. The disclosed embodiments are presented for purposes of illustration and not limitation.

What is claimed is:

1. An optical assembly, comprising:
a light directing film having an average effective transmission of at least 1.3;
a light diffusing film having an optical haze of at least 5%; and
a plurality of spaced apart posts disposed and defining an air gap between the light directing and diffusing films, the plurality of spaced part posts being disposed on a first major surface of a substrate having an opposing second major surface, a first end of each post being attached to the first major surface of the substrate, an opposing second end of each post being attached to the light diffusing film via a first adhesive layer, the first adhesive layer forming a meniscus at each post, the meniscus having an outer surface radius of at least 0.5 micrometers;
wherein the plurality of spaced apart posts comprises a one dimensional array of spaced apart parallel linear posts, wherein for each linear post, a ratio of a length of the post to a width of the post is at least 10.

2. The optical assembly of claim 1, wherein the light directing film comprises a prism film comprising a plurality of linear prisms extending along a same direction.

3. The optical assembly of claim 1, wherein the light directing film comprises a reflective polarizer.

4. The optical assembly of claim 1, wherein the light directing film comprises a reflective polarizer and a prism film comprising a plurality of linear prisms extending along a same direction.

5. The optical assembly of claim 1, wherein the light directing film has an average effective transmission of at least 1.5.

6. The optical assembly of claim 1, wherein the light diffusing film comprises a surface diffuser.

7. The optical assembly of claim 1, wherein the light diffusing film comprises a volume diffuser.

8. The optical assembly of claim 1, wherein the light diffusing film comprises a symmetric diffuser that scatters light in a first direction with a first viewing angle $A_H$ and in a second direction orthogonal to the first direction with a second viewing angle $A_V$ substantially equal to $A_H$.

9. The optical assembly of claim 8, wherein a difference between $A_V$ and $A_H$ is less than 10 degrees.

10. The optical assembly of claim 1, wherein the light diffusing film comprises an asymmetric diffuser that scatters light in a first direction with a first viewing angle $A_H$ and in a second direction orthogonal to the first direction with a second viewing angle $A_V$ substantially different from $A_H$.

11. The optical assembly of claim 10, wherein a difference between $A_V$ and $A_H$ is greater than 15 degrees.

12. The optical assembly of claim 1, wherein the light diffusing film has an optical haze of at least 10%.

13. The optical assembly of claim 1, wherein a cross-section of each linear post in a direction perpendicular to the length of the post comprises a straight side edge.

14. The optical assembly of claim 1, wherein a cross-section of each linear post in a direction perpendicular to the length of the post comprises a curved side edge.

15. The optical assembly of claim 1, wherein a cross-section of each linear post in a direction perpendicular to the length of the post is a trapezoid.

16. The optical assembly of claim 1, wherein the air gap has an average height $H_{avg}$, each post having a maximum lateral width $W_{max}$, a minimum lateral width $W_{min}$ and an average lateral width $W_{avg}$ in the air gap, $W_{max}/W_{min}$ being less than 5 $H_{avg}/W_{avg}$ being at least 2.

17. The optical assembly of claim 1, wherein an average thickness of the first adhesive layer is less than 10 micrometers.

18. The optical assembly of claim 1, wherein the second major surface of the substrate is attached to the light directing film via a second adhesive layer.

19. An optical assembly, comprising:
a light directing film having an average effective transmission of at least 1.3;
a light diffusing film having an optical haze of at least 5%; and
a plurality of spaced apart posts disposed and defining an air gap between the light directing and diffusing films, the plurality of spaced part posts being disposed on a first major surface of a substrate having an opposing second major surface, a first end of each post being attached to the first major surface of the substrate, an opposing second end of each post being attached to the light diffusing film via a first adhesive layer, the first adhesive layer forming a meniscus at each post, the meniscus having an outer surface radius of at least 0.5 micrometers;

wherein the plurality of spaced apart posts comprises a two-dimensional array of posts, wherein for each post in the two-dimensional array of posts, a ratio of a height of the post to a width of the post is less than 100.

20. The optical assembly of claim 19, wherein at least some of the posts in the plurality of spaced apart posts comprise a piecewise planar facet.

21. The optical assembly of claim 19, wherein at least some of the posts in the plurality of spaced apart posts comprise a piecewise curved facet.

\* \* \* \* \*